US006888554B1

(12) United States Patent
Decombe (10) Patent No.: US 6,888,554 B1
(45) Date of Patent: May 3, 2005

(54) USER INTERFACE FOR BICONTEXTUAL EXPLORATION OF A GRAPH

(75) Inventor: Jean-Michel Decombe, Palo Alto, CA (US)

(73) Assignee: Groxis, Inc., San Francisco, CA (US)

( * ) Notice: Subject to any disclaimer, the term of this patent is extended or adjusted under 35 U.S.C. 154(b) by 497 days.

(21) Appl. No.: 09/866,346

(22) Filed: May 24, 2001

Related U.S. Application Data

(60) Provisional application No. 60/207,130, filed on May 24, 2000.

(51) Int. Cl.[7] .................................................. G09G 5/00
(52) U.S. Cl. ........................ 345/645; 345/853; 345/854
(58) Field of Search ................................. 345/853, 854, 345/855, 738, 619, 642, 645, 646, 473

(56) References Cited

U.S. PATENT DOCUMENTS

| | | | | |
|---|---|---|---|---|
| 5,295,243 | A | * | 3/1994 | Robertson et al. .......... 345/649 |
| 5,606,654 | A | | 2/1997 | Schuur |
| 5,615,325 | A | | 3/1997 | Peden |
| 5,844,559 | A | | 12/1998 | Guha |
| 6,031,537 | A | | 2/2000 | Hugh |
| 6,037,944 | A | | 3/2000 | Hugh |
| 6,104,400 | A | | 8/2000 | Halachmi |
| 6,166,736 | A | | 12/2000 | Hugh |
| 6,166,739 | A | | 12/2000 | Hugh |
| 6,237,006 | B1 | * | 5/2001 | Weinberg et al. ........... 345/853 |
| 6,256,032 | B1 | | 7/2001 | Hugh |
| 6,285,367 | B1 | | 9/2001 | Abrams |
| 6,348,927 | B1 | | 2/2002 | Lipkin |
| 6,393,159 | B1 | | 5/2002 | Prasad et al. |
| 6,404,446 | B1 | | 6/2002 | Bates et al. |
| 6,460,025 | B1 | | 10/2002 | Fohn |
| 6,496,842 | B1 | | 12/2002 | Lyness |
| 6,549,221 | B1 | | 4/2003 | Brown et al. |
| 6,604,108 | B1 | * | 8/2003 | Nitahara ...................... 707/102 |
| 6,628,304 | B2 | | 9/2003 | Mitchell et al. |
| 2001/0034733 | A1 | * | 10/2001 | Prompt et al. .............. 707/102 |

FOREIGN PATENT DOCUMENTS

| | | |
|---|---|---|
| WO | WO 00/13104 | 3/2000 |
| WO | WO 01/15011 | 3/2001 |

OTHER PUBLICATIONS

Bederson et al, Pad++: A Zoomable Graphical Sketchpad For Exploring Alternate Interface Physics, Journal of Visual Languages and Computing, vol. 7, 1996, UK.
Bederson et al, Pad++: A Zoomable Graphical Sketchpad For Exploring Alternate Interface Physics, Symposium on User Interface Software and Technology, 1994, Marina del Rey, CA.
Hightower et al, Graphical Multiscale Web Histories: A Study of PadPrints, ACM Conference on Hypertext, Jun. 20, 1998, Pittsburg, PA.
Bederson et al, Implementing a Zooming User Interface: Experience Building Pat++, Software: Practice and Experience, vol. 28, No. 10, Aug. 1998, West Sussex, England.
Perlin et al, Pad—An Alternative Approach to the Computer Interface, ACM SIGGRAPH, 1993, Anaheim, CA.

(Continued)

*Primary Examiner*—Matthew Luu
(74) *Attorney, Agent, or Firm*—Gary Zalewski; Strategic Patent Services, Inc.

(57) ABSTRACT

A user interface with parameters that can be adjusted to display only a few nodes, in order to facilitate exploration, or many nodes simultaneously, in order to facilitate an user's understanding of a graph of nodes of information. The user interface provides for exploring a collection of connected objects simultaneously from the hierarchical and the relational points of view, and increases exposure to related information while maintaining context. Parameters can be adjusted to increase or decrease the extent of the relational context.

32 Claims, 5 Drawing Sheets the hierarchical view mode the mixed view mode

OTHER PUBLICATIONS

Bederson et al, A Zooming Web Browser, SPIE Multimedia Computing and Networking, vol. 2667, pp 260–271, 1996, San Jose, CA.

Bederson et al, A Zooming Web Browser, Human Factors in Web Development, Lawrence Erlbaum Assoc., pp 255–266, 1998, Mahwah, NJ.

Bederson et al, Space–Scale Diagrams: Understanding Multiscale Interfaces, ACM SIGCHI, 1995, Denver CO.

Bederson et al, Advances in the Pad++ Zoomable Graphics Widget Bederson, USENIX Tcl/Tkm'95 Workshop, 1995, Toronto, CA.

Bederson et al, Pad++ A Zoomable Graphical Interface, ACM SIGCHI '94, 1994, Boston, MA.

* cited by examiner this node's connection with the focus is represented by adjacency.

this node's connection with the focus is represented by inclusion.

Figure 1

| range = 2ž and center = any | range = ž and center = 1.0 | range = 4.5 and center = ž |

FIG 2(a)　　　Figure 2(b)　　　Fig 2(c)

Figure 3 context-to-focus ratio = 0%  
Fig 4(a)

context-to-focus ratio = 30%  
Figure 4(b)

minimum node size reduced  
Fig 4(c)

USER INTERFACE FOR BICONTEXTUAL EXPLORATION OF A GRAPH

This application claims the benefit of provisional application No. 60/207,130, filed May 24, 2000.

FIELD OF THE INVENTION

The present invention relates to a user interface optimized to display and explore a graph of information via a display device for an electronic device such as a computer, personal digital assistant, television, cellular telephone, etc.

BACKGROUND OF THE INVENTION

A user interface in accordance with the present invention is easier to use than prior art user interfaces designed to serve the same purpose, primarily due to click focusing and node aggregation mechanisms. Parameters can be adjusted to display only a few nodes, in order to facilitate exploration, or many (e.g., thousands) of nodes simultaneously, in order to facilitate an individual's understanding of a graph of nodes of information.

The user interface provides users the ability explore any collection of connected objects simultaneously from the hierarchical and the relational points of view. Bicontextual exploration broadens a user's perspective by increasing exposure to related information while maintaining context. Parameters can be adjusted to increase or decrease the extent of the relational context.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data within a memory of an electronic device such as a computer. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical, optical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or other electronic device, that manipulates and transforms data represented as physical (electronic) quantities within the device's registers and memories into other data similarly represented as physical quantities within the memories or registers or other such information storage, transmission or display devices.

The invention also relates to apparatus for performing the operations herein. These apparatus may be specially constructed for the required purposes, or may comprise a general-purpose computing or electronic device selectively activated or reconfigured by a program stored in the device. Such a program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The user interface described herein differs from the prior art insofar as its ability to let users explore any collection of connected objects simultaneously from the hierarchical and the relational points of view. Bi-contextual exploration broadens a user's perspective by increasing exposure to related information while maintaining context. Parameters can be adjusted to increase or decrease the extent of the relational context.

The present user interface, described herein, claim priority to the user interface described in a related patent application entitled "An Improved User Interface for Displaying and Exploring Hierarchical Information", filed May 16, 2001, application Ser. No. 09/859,343 which is incorporated by reference. The present user interface is easy to use, just as is the user interface described in the related patent application, and preserves all of the qualities described in the related patent application. The present user interface also relies primarily on click focusing, i.e., the ability to navigate an information space by focusing on any information object through pointing and selecting.

A user interface in accordance with the present invention can be used to explore any kind of graph of information, for example, directories, query result sets (from databases engines, search engines, etc.), file stores, where information objects are organized in hierarchical sets and connected through relations. Furthermore, the user interface contemplated by the present invention can be used on or in conjunction with any platform that has a pointing device (e.g., mouse, trackball, stylus, directional pad, remote control, etc.), including personal computers, Internet appliances, personal digital assistants, telephones, mobile or cellular telephones, television sets, etc. It is also contemplated that the user interface can be controlled through speech, eye movement, and other modalities.

Figure 1:
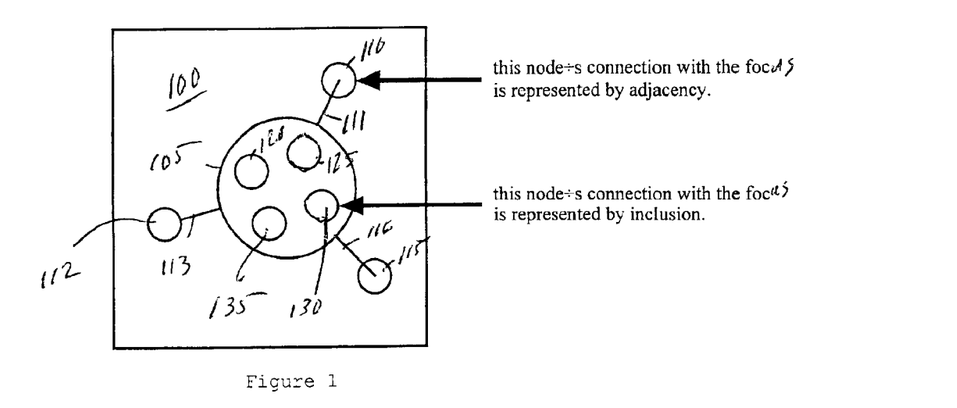
FIG. 1 illustrates connections rendered by inclusion or by adjacency in accordance with one embodiment of the present invention.

With reference to FIG. 1, in accordance with the invention, access to a graph of information 100 is provided. The graph comprises nodes of information, or simply, nodes. A node of interest or focus for a user viewing and accessing the graph of information 100 is called the focus node 105, or simply, focus 105. The focus 105 can and is expected to change as the user explores the graph.

The graph of information 100 is displayed within a viewing region, or view, of a given size, known as the view size. Often times, the view size is, at least in part, a function of the viewable area of a display device, and may also be affected by the size of a window displayed on the display device in which window the graph of information is displayed. The focus 105, in one embodiment, essentially is centered in the viewing region, and occupies a certain percentage of the view size, known as the focus-to-view size ratio, or more simply, focus-to-view ratio. Other nodes displayed in the viewing region are displayed inside the focus, if the focus contains the nodes, e.g., nodes 120–135, or outside the focus, if the nodes are related with the focus, e.g., nodes 110, 112, and 115. To be displayed, nodes need to intersect with the viewing region and be larger than a certain size, known as the minimum node size.

In general, a graph is composed of connected nodes, where each connection can be individually rendered by inclusion or by adjacency. In a hierarchy of nodes, all connections between nodes would usually be rendered in a similar manner, for example, by inclusion. A graph, also known as a tree, however, has fewer mathematical constraints than a hierarchy. For instance, there might be several connections leading to a given node in a graph.

Again with reference to FIG. 1, node 105 is the node of focus in the graph, that is, the user has selected node 105 for examination, and the user interface responds by centering and expanding the node for examination, as illustrated. Node 110 is adjacent to node 105 and is connected thereto by branch 111. Nodes 112 and 115 likewise are adjacent to node 105 and are respectively connected to node 105 by branches 113 and 116. Nodes 120–135, on the other hand, are rendered by inclusion, that is, the nodes are included within, and hierarchically below, node 105.

It should be noted that the rendering of a connection is not necessarily limited to inclusion or adjacency. For example, in one embodiment of the present invention, it is also possible to render a connection by extraction, i.e. by displaying the connected node outside of the view, for instance, in tabular form.

The nodes whose connections with the focus node are rendered by adjacency are displayed around the focus node and form, along with other visible nodes connected with them by adjacency, what is known as the relational context. For example, nodes 110, 112, and 115 form the relational context for focus node 105. The range where the relational context is displayed around the focus node, rather than hidden, is known as the relational angular range and expressed in radians, and is within $]0, 2\pi]$. The angle around which this range is centered, known as the relational angular center and also expressed in radians, is within $[0, 2\pi[$.

Figure 2A:
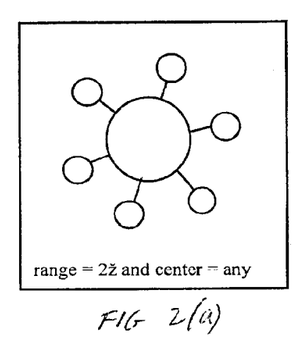
FIGS. 2a–c illustrates various values for the relational angular range and the relational angular center in accordance with one embodiment of the present invention.
Figure 2B:
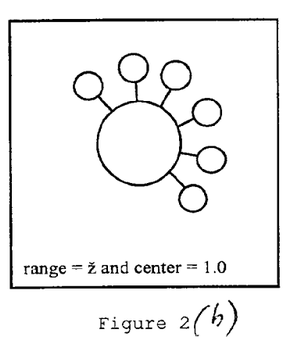
Figure 2C:
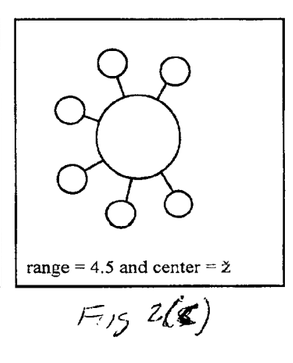

When the relational angular range equals $2\pi$, the value of the relational angular center is still relevant because it affects the positions of individual branches, or links, especially when there is only one node connected with the focus node by adjacency. With reference to FIGS. 2(*a*), 2(*b*) and 2(*c*), the relational angular range and relational angular center are illustrated. In FIG. 2(*a*), the range is $2\pi$ radians and the center is any value in the domain of valid values for the relational angular center, that is, between 0 and $2\pi$ radians. In FIG. 2(*b*), the range is $\pi$ radians and the center is 1.0 radian, and in FIG. 2(*c*), the range is 4.5 radians and the center is $\pi$ radians.

Further with reference to FIGS. 2(*a*), (*b*) and (*c*), the angle 0 is, just like in mathematics, at the rightmost point of the focus node. As the angle increases, the corresponding point moves counterclockwise around the perimeter of the focus node. Thus, in the FIG. 2(*b*), the range is indeed 180 degrees ($\pi$ radians) centered at a 57 degrees angle (roughly 1 radian). Similarly, in FIG. 2(*c*), the range is 256 degrees (roughly 4.5 radians) out of 360 degrees maximum centered at a 180 degrees angle ($\pi$ radians). In FIG. 2(*a*), different values of the center simply rotate the entire relational context around the focus node at various angles.

It is appreciated that nodes in the relational context situated at the same path distance from the focus node do not necessarily have to be the same size even though they are illustrated as such in FIGS. 2(*a*), 2(*b*) and 2(*c*).

Figure 3:
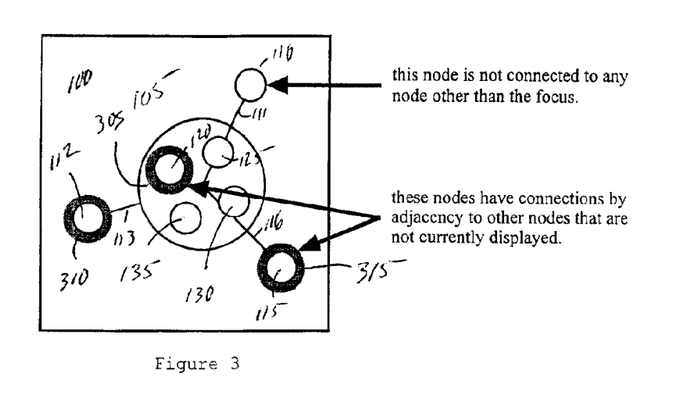
FIG. 3 illustrates an indication of further connections using the adjacency border in accordance with one embodiment of the present invention.

With reference to FIG. 3, a border, known as the adjacency border, is drawn around any node in the view that has connections to other nodes, rendered by adjacency, that are not all displayed. The adjacency border is drawn around all such nodes, whether they appear in the hierarchy or in the relational context. The adjacency border may, for example, be rendered as a halo or a convex ring. In FIG. 3, node 120, rendered by inclusion within focus node 120, is surrounded by adjacency border 305. Likewise, nodes 112 and 115, rendered by adjacency to focus node 120, are respectively surrounded by adjacency borders 310 and 315. Thus, nodes 112, 115 and 120 are in view, and have connections to other, adjacent nodes, that are not displayed.

The nodes inside the focus node, that is nodes 120–135, are part of the hierarchical context, not part of the relational context, of the graph 100. One of the nodes, node 120, has an adjacency border, just like nodes 112 and 115 in the relational context. However, it is not possible to see the nodes connected by adjacency to the node 120 inside the focus node unless node 120 becomes the focus node, or somehow becomes part of the relational context, for example, after the user having executed a few navigational commands. On the other hand, in order for the user to see the nodes connected by adjacency to nodes 112 and 115, it would be enough to adjust a few parameters, such as the context-to-focus ratio or the minimum node size. This is what is shown in FIG. 4, and described below.

In one embodiment, the width of the adjacency border is determined by applying to the size of the bordered node a ratio known as the adjacency border ratio. The resulting width in pixels is guaranteed to be at least equal to one pixel, no matter what the adjacency border ratio is, so that the adjacency border is always visible even around relatively smaller nodes.

In the relational context, the size of nodes directly connected with the focus is determined by applying to the size of the focus a ratio known as the context-to-focus ratio. If the resulting size is less than a minimum node size for displaying a node, then the connected nodes are not displayed and the adjacency border appears around the focus node. Otherwise, the nodes are displayed and the context-to-focus ratio is recursively applied to the nodes connected to the connected nodes by adjacency. As a result, the length of the largest path from the focus node to a connected node in the relational context can vary, and the size of any node displayed in the relational context usually reflects the length of the path between the focus node and the displayed node.

Figure 4A:
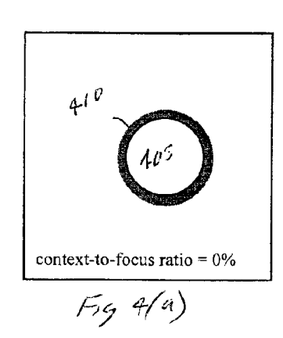
FIG. 4 illustrates various values for the context-to-focus ratio in accordance with one embodiment of the present invention.
Figure 4B:
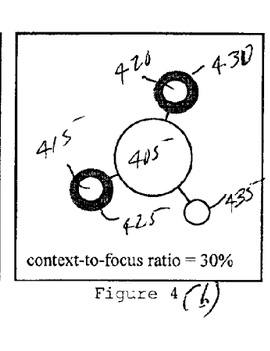
Figure 4C:
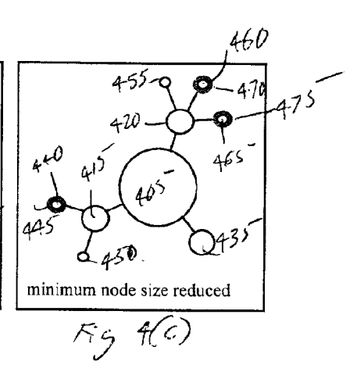

For example, in FIG. 4(a), focus 405 is surrounded by adjacency border 410. The context-to-focus ratio is 0%, meaning the size of the nodes directly connected to the focus is null, and the adjacency border appears around the focus node. In FIG. 4(b), the context-to-focus ratio is 30%, meaning nodes connected to he focus node are displayed at a size 30% of the focus node size. The size of these nodes, namely, nodes 415, 420 and 435, is larger than the minimum node size parameter, so the nodes are displayed. Notice, however, nodes 415 and 420 surrounded by adjacency borders 425 and 430, respectively, indicating these nodes have nodes connected thereto that, when the context-to-focus ratio is applied to them, are smaller than the minimum node size, and thus, not displayed. FIG. 4(c) illustrates what happens when the minimum node size is reduced such that the nodes connected to nodes 415 and 420 are larger than the minimum node size given a context-to-focus ratio of, for example, 30%. Nodes 440, 450 are displayed as being connected to node 415, and nodes 455, 460 and 475 are displayed as being connected to node 420.

It should be noted that some of the nodes in the relational context that are directly connected to the focus may be visible while some others may not be, because they have different sizes, some being large enough to be displayed, and the others not (because their size is less than the minimum node size). In that case, the adjacency border would still be displayed around the focus node. So the adjacency border is always displayed unless all the nodes in the relational context directly connected to the focus node are visible.

The extent of the relational context can be limited by manipulating a variable known as the maximum relational path length, thus ensuring that, in the relational context, nodes whose shortest path from the focus node is greater than the maximum relational path length will never be displayed.

It is appreciated that nodes in the relational context may have connections to other nodes rendered by inclusion. Thus, such nodes might be displayed, for example, as convex shapes, unless their content is entirely visible, to indicate hidden content.

Figure 5A:
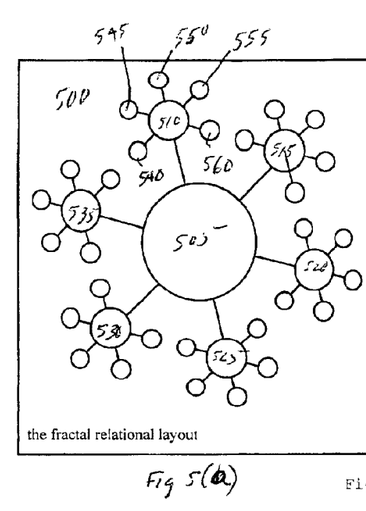
FIG. 5 illustrates fractal and radial relational layouts in accordance with one embodiment of the present invention.
Figure 5B:
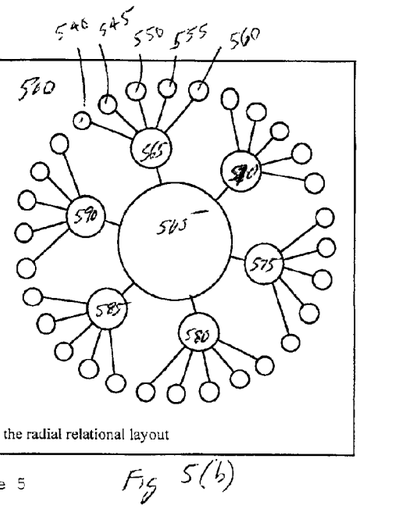

The relational context can be displayed in any of at least two relational layouts: fractal, as illustrated in FIG. 5(a), and radial, as illustrated in FIG. 5(b). Nodes are arranged in concentric circles in the radial layout, thus making it easier for a user to mentally grasp the path distance from the focus to any node at a glance.

In either the radial or fractal relational layouts, it should be noted that even if the relational angular range equals $2\pi$, nodes in the relational context are not necessarily spread around the entire perimeter of the largest node with which they are connected, especially if there is only one connection from the focus node.

The minimum length of the links that connect any two nodes in the relational context is determined by applying to the size of the largest of these two nodes a ratio known as the link-to-node ratio. The length of the link actually displayed may sometimes be greater due to constraints imposed by the relational layout (especially in the case of the fractal layout).

Figure 6A:
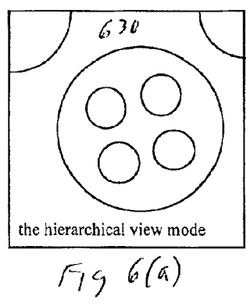
FIG. 6 illustrates hierarchical, relational, and mixed view modes in accordance with one embodiment of the present invention.
Figure 6B:
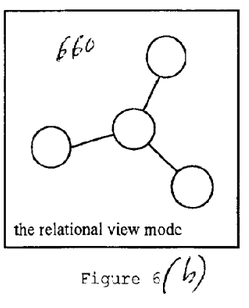
Figure 6C:
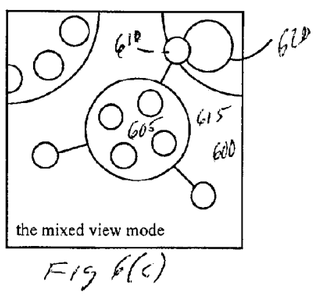

A view mode is contemplated, wherein the view mode can be one of three modes: hierarchical 630 (FIG. 6(a)), relational 660 (FIG. 6(b)), and mixed, that is, both hierarchical and relational (FIG. 6(c)). The view mode that is initially presented to the user, known as the default view mode, in one embodiment, is usually the mixed view mode 600. In this mode, the relational context, for example, floats above the hierarchy. To illustrate, in FIG. 6(c), node 610 is connected with node 605, and rendered by adjacency to node 605. This relational context overlays, that is, floats above, the hierarchy of nodes 615 and 620. Each mode has its own focus-to-view ratio and context-to-focus ratio settings.

A user can select, via an input device such as a mouse, any node in the hierarchy or in the relational context to make the node the new focus node. Navigation in a hierarchical, relational or mixed, mode is animated to facilitate the exploration of large or complex graphs. Nodes and links progressively change, appear, or disappear through an interpolation from their source to their destination position, size, color transparency, and possibly other properties.

A detailed discussion of animation in the hierarchical context follows. Initially, those nodes larger than the minimum node size are displayed. For example, a root node, the focus node, is displayed and centered about viewing region. Further nodes are displayed, some of which may be flat, two-dimensional nodes, indicating, in one embodiment of the invention, that the nodes are empty, that is, leaf nodes. Other nodes, on the other hand, may be rendered with a visual cue i.e. convex or spherical shaped nodes, indicating such nodes contain yet further nodes containing a subset of hierarchical information.

The transition from one focus node to the next, i.e., from a source node to a destination node, is animated, in one embodiment of the invention, to avoid disorienting the user, through a given number of animation frames, known as the animation frame count. The transition may be linear to avoid inducing in the user any feeling of motion sickness during lengthy exploration sessions. The speed of the transition, known as the animation speed factor, is constant by default but can be adjusted so as to speed up or slow down the transition. For example, a user may select a node other than the focus node by clicking on the node using an input device such as a mouse. The selected node begins to expand and migrate toward the center of the viewing region. As the selected node progressively becomes the focus, it may be centered in the view and gets larger.

(The term "source node", as used herein, refers to the source focus node, that is, the present focus node, or simply, focus node. The term "destination node" as used herein, refers to the destination focus node, that is, the node that the user has selected and that is to become the focus, once the transition from the present focus to the selected node is completed).

Eventually, the selected node is centered and the visible space provided for the node increased, relative to the size of the node as originally viewed. The node size of the selected node increased in the transition, and any nodes contained or included within node may now be larger than the minimum node size and would, thus, be displayed as well. Optionally, nodes contained in nodes other than the focus node, and which are larger than the minimum node size, are also displayed.

It should be noted that when the distance between the source node and destination node is so large that the animation would not fill its cognitive role (because no two successive animation frames ever intersect), the transition may become, in one embodiment of the present invention, a combination of translating and morphing to suggest or infer the direction and length of the vector from destination node's position to the source node's position (i.e., the center of the view).

In this manner, the destination node's position and size are first computed relative to the focus node. Then, a vector from the destination node's position to the source node's position is computed. If the vector is too long, that is, if the vector divided by the animation frame count still exceeds the size of the view, a morphing animation is used to symbolize the long translation. Otherwise, the vector is broken down into a discrete amount of steps. Then, the destination node's position and size is progressively adjusted to reach those of the focus node.

To reiterate, the vector is too long if, after having divided it by the number of transition frames, also known as the animation frame count, the resulting, smaller vector still exceeds the dimensions of the view. In other words, if one were to draw each animation frame thusly obtained next to one another, one would notice that no two successive frames have any pixel in common, because they do not intersect—if the frames were displayed in succession to animate the transition, the user would not detect motion. The user would merely see the screen display jumping from one frame to a totally different next frame, and so on.

In a mixed view mode, if the destination focus is in the hierarchy, the view is adjusted just like in hierarchical view mode described above (i.e. the selected node is simply translated and stretched, unless the vector from the destination focus node to the source focus node is too long, in which case it is translated and morphed) but additionally, the relational context around the source focus node, if any, progressively disappears into the source focus node, while a new relational context, if any, progressively appears around the destination focus node.

Figures 7A, 7B:
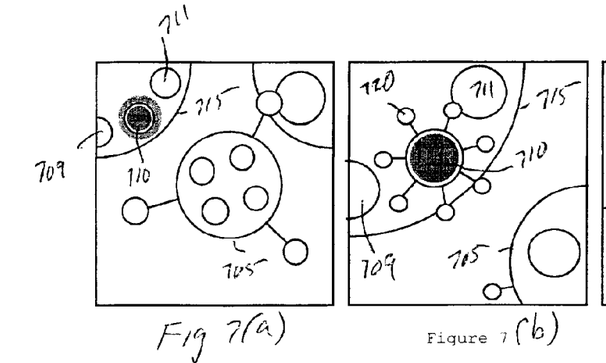
FIG. 7 illustrates navigation to a new focus in the hierarchy in accordance with one embodiment of the present invention.
Figure 7C:
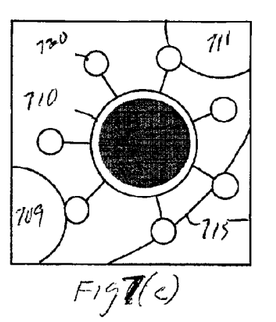

With reference to FIG. 7(a), node 705 is the source focus node in a mixed view mode. A user has just selected node 710 in the hierarchy of nodes beginning with node 715. Node 710 is thus the destination focus node. The node 710 is surrounded by a border, known as the adjacency border, indicating node 710 has connections to other nodes, rendered by adjacency, that are not all displayed. In FIG. 7(b), a snapshot of the animation that occurs in migrating from source focus node 705 to destination focus node 710 is illustrated. Node 710 is stretching in size and migrating to the center of the view. Moreover, the node hierarchically above node 710, that is, node 715, likewise is stretching in size and migrating to the center of the view, as are peer nodes, e.g., nodes 709 and 711. Additionally, as node 710 expands in size, depending on the context-to-focus ratio and the minimum node size parameters, the nodes adjacent node 710, but previously not displayed, come into view, e.g., node 720. Note also that the source focus node is moving out of the viewing area, as are all other nodes associated therewith. Finally, in FIG. 7(c), the animated transition from source to destination focus node is shown completed, with node 710 centered and expanded, and the hierarchical and relational context of node 710 is accordingly adjusted as well.

Figure 8A:
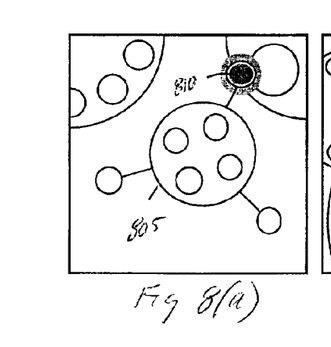
FIG. 8 illustrates navigation to a new focus in the relational context in accordance with one embodiment of the present invention.
Figure 8B:
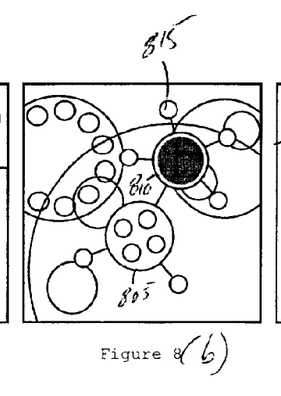
Figure 8C:
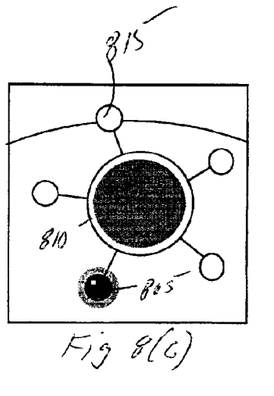

If the destination focus is in the relational context, the view is also adjusted like in hierarchical view mode but as the destination focus comes to the center, the source focus shrinks and moves away from it, as it is now becoming itself part of the relational context. This is illustrated in FIGS. 8(a), (b) and (c). In FIG. 8(a), node 805 is the source focus node and a user has just selected node 810, in the relational context of node 805. Node 810 thus becomes the destination focus node and an animated transition from source to destination focus node begins, with the source focus shrinking and moving away from the center of the view, and the destination focus node expanding and moving to the center of the view.

In FIG. 8(a), selected node 810 is surrounded by an adjacency border, but as this node, as the destination focus node, expands and moves into view, its context becomes visible as the context-to-view ratio exceeds the minimum node size, as illustrated in FIG. 8(b), wherein nodes in the relational context of node 810 are visible, e.g., node 815. Note also that the source focus node is decreasing in size relative to the destination focus node. Finally, in FIG. 8(c), the animated transition from source to destination focus node is shown completed, with node 810 centered and expanded, and the hierarchical and relational context of node 810 is accordingly adjusted as well. Note that as the nodes in the relational context of source focus node 810 decrease in size below the minimum node size, these nodes disappear, and node 810 becomes surrounded by the adjacency border.

Again with reference to FIG. 8(b), the two hierarchies appear to mix in the background of the view. Indeed, one of the hierarchies is the hierarchy to which the previous, that is, source, focus node belongs, and the other hierarchy is the hierarchy to which the new, that is, destination, focus belongs. Since there is a morphing effect from one hierarchy into the other, both are simultaneously visible at some point, in the middle of the animation. Note that the hierarchies also are being translated and stretched at the same time, as they follow the transformations applied to the source and destination focus nodes. Finally, note that the source focus node 805, after it has become part of the relational context as illustrated in FIG. 8(c), now has an adjacency border (indeed it is connected by adjacency to two nodes that were still visible in FIGS. 8(a) and (b). The node can also convey a shape, such as a convex shape, for example, to indicate the four nodes it contains are now too small to be displayed.

Figure 9:
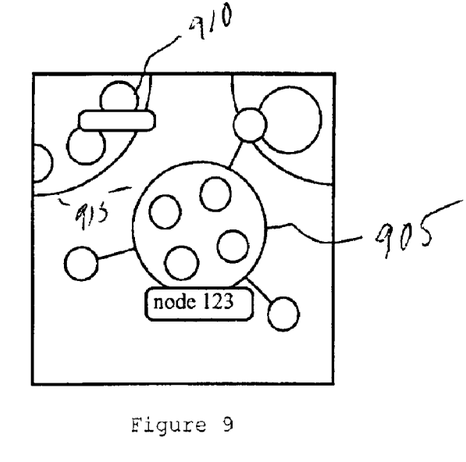
FIG. 9 illustrates a representation of the multiple instances of the focus in accordance with one embodiment of the present invention.

A relational context, as defined and referred to herein, is essentially the tree representation of a subgraph. As a result, the same node may appear in the relational context more than once. Indeed, a given node may even appear in the hierarchy as well, possibly several times if there are multiple connections to it rendered by inclusion. To help the user realize that fact, the various visible instances of the focus node may be rendered with some of the visual attributes usually reserved to the focus node, e.g. a framed label, and so on. For example, in FIG. 9, a node 905 is labeled "node 123". This same node is rendered by inclusion in node 915 as node 910. Node 910, thus, also is labeled "node 123".

Figures 10A, 10B:
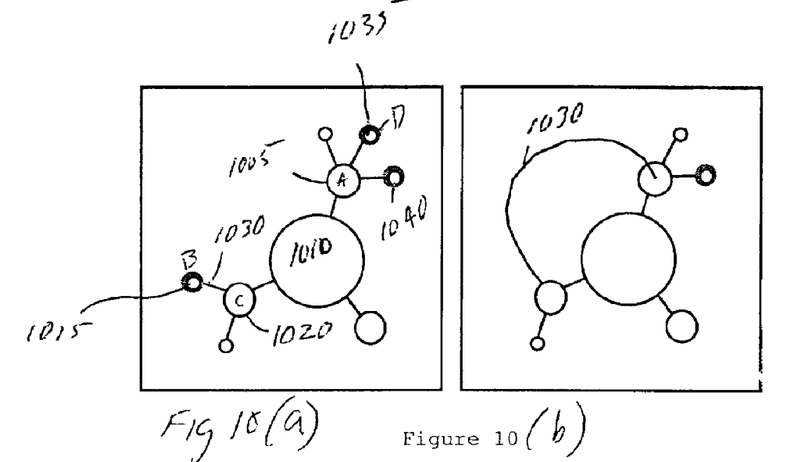
FIG. 10 illustrates a multiple instance hiding flag being unset and set in accordance with one embodiment of the present invention.

In an embodiment of the invention, it is possible to minimize the number of instances of any given node displayed in the relational context, by setting a flag known as multiple instance hiding flag. When this flag is set, the largest instance of any given node in the relational context is preserved (i.e., displayed) while all other instances of the node are hidden. Links that appeared between those instances of the node now hidden and other nodes now appear between the preserved instance of the node and those other nodes. For example, FIG. 10(*a*) illustrates a node 1005 directly connected with a focus node 1010. In this example, node 1005 is replicated as node 1015, which is connected by link 1030 with node 1020. Node 1020, in turn, is directly connected with the focus node 1010. When the multiple instance hiding flag is set, node 1015 disappears to keep only one instance in the view (the largest instance, that is, node 1005). The question is what happens to the link 1030 that node 1015 had with node 1020. As illustrated in FIG. 10(*b*), the link is simply reconnected to the preserved instance of the same node, i.e., link 1030 now connects node 1020 to node 1005, thus the spline shape to make the view appear less cluttered. While this reconnection of the link does not seem to simplify the view significantly in this simple example, suppose that the relational context was much larger and deeper, and that node 1015 was connected to more nodes, and so on. What this means is that it would be true of node 1005 too, since the nodes are both clones of one another, so there would be a lot of duplicated nodes in the relational context. By simplifying the view using the described technique, node 1015 not only disappears from the view, but all duplicated instances of all nodes to which node 1015 is connected, further away from the focus, disappear as well.

The following example illustrates that multiple instances can occur. Suppose that all nodes represent persons, and that all connections indicate which persons each person knows. In our example, the focus node 1010 knows nodes 1015 and 1015, as well as a third person. But node 1020 in turn knows node 1005 and a second person. For this reason, node 1015 is used as a second visual instance of node 1005. This can be useful at times, especially if setting the multiple instance hiding flag would result in a huge number of links.

Since node 1020 is connected with node 1015 which is itself another instance of node 1005, then there must be another instance of node 1020, referred to as node 1035, that is connected to node 1005 on the display. More precisely, one of the two nodes 1035 and 1040, have an adjacency border (indeed, node 1020, and therefore node 1035, is connected to two other nodes besides node 1015, i.e., node 1005).

It should be noted that in order to keep the display more understandable, more readable, the adjusted links could, for example, be represented as splines, rather than just lines.

Connection directionality in the relational context is usually represented using arrowheads, which might be bi-directional when connections exist both ways between two nodes. In order to simplify the display even further, the user may choose to hide arrowheads for all links that are more than a certain path distance away from the focus. This distance is known as the maximum arrowhead path distance.

To summarize, the parameters that control relational display and navigation are:

relational angular range, in the domain $]0, 2\pi]$;

relational angular center, in the domain $[0, 2\pi[$;

adjacency border ratio, in the domain $[0, +\infty[$, usually reduced to $[0, 0.5]$;

context-to-focus ratio, in the domain $[0, +\infty[$, usually reduced to $[0, 0.5]$;

maximum relational path length, in the domain $\{0, 1, 2, \ldots, +\infty\}$;

relational layout, in the domain {"fractal", "radial", ... };

link-to-node ratio, in the domain $[0, +\infty[$, usually reduced to $[0, 5]$;

view mode, in the domain {"hierarchical", "relational", "mixed"};

multiple instance hiding flag, in the domain {"false", "true"};

maximum arrowhead path distance, in the domain $\{0, 1, 2, \ldots, +\infty\}$.

The view mode can be set using a user interface widget, e.g. a mode selector. The view mode switching process is animated in a similar vein as the focus switching process in relational navigation, as described above. All others parameters can be set using linear sliders or other common user interface widgets.

What is claimed is:

1. A user interface system comprising:

a plurality of nodes organized into a graph of information wherein at least one node is a source node having focus, and one or more nodes forming a sub-hierarchy of the source node and represented in a view in relation to the source node by inclusion, and where one or more nodes connecting to the focus are represented in relation to the focus in a manner adjacent to the focus, a means for rendering nodes that operates according to a set of parameters that define the representation and position of nodes in the view, such that the nodes connected to the focus are represented in a view in an adjacent relation to the focus, and where the one or more nodes forming a sub-hierarchy of the source node is represented in a view in relation to the source node by inclusion.

2. The user interface of claim 1, wherein the means for rendering nodes also defines the representation of links that connect one node to another node, and where one of the parameters in the set defining the representation and position of nodes in the view, relates to the angular range and effects the positions of individual branches, links and positions of relational nodes.

3. The user interface of claim 1, wherein the means for rendering nodes also defines the representation of links that connect one node to another node, and where one of the parameters in the set defining the representation and position of nodes in the view, relates to the angular center and effects the positions of individual branches, links and positions of relational nodes.

4. The user interface of claim 1, wherein the means for rendering nodes is capable of producing a visual cue to the user to indicate that a node in the view is connected to other nodes that are not displayed in the view.

5. The user interface of claim 1, wherein the means for rendering nodes is capable of producing a scaled representation of adjacent nodes in the system whereby according to a context-to-focus parameter, the scale adjustment of adjacent nodes in relation to the scale of the focus node is produced.

6. The user interface of claim 1, wherein the means for rendering nodes is capable of producing a fractal or radial relational view.

7. The user interface of claim 6, wherein the radial view produces nodes arranged in concentric circles.

8. The user interface of claim 1, wherein the means for rendering nodes is capable of producing a view selected from the group consisting of hierarchical, relational and mixed.

9. The user interface of claim 1, wherein a mixed view is selected and the means for rendering nodes produces nodes that appear to float above other nodes.

10. The user interface of claim 1, wherein the means for rendering nodes produces a representation of nodes according to a minimum node size.

11. The user interface of claim 1, wherein the means for rendering nodes in the view with a node to indicate that the node contains sub-hierarchy that is completely hidden.

12. The user interface of claim 1, wherein the means for rendering nodes in the view produces a representation of nodes using visual cues to facilitate user navigation in the system.

13. The user interface of claim 1, wherein the user adjustment of one or more parameters results in the display of few or many nodes to simplify exploration or facilitate an individual's understanding of the entire hierarchy of information, respectively.

14. The user interface of claim 1 wherein the graph of information relates to a member of the set consisting of query result set from database engine, query result set from internet search engine and file store.

15. The user interface of claim 1, wherein a parameter in the set used to render the representation of nodes in the view is selected from the group consisting of relational angular range, relational angular center, adjacency border ratio, context-to-focus ratio, maximum relational path length, relational layout, link-to-node ratio, view mode, multiple instance hiding flag, and maximum arrowhead path distance.

16. The user interface of claim 1, wherein a user may select a node in the view to designate the selected node as the new focus node.

17. The user interface of claim 16, wherein upon selection of a node in the view, the means for rendering nodes in the view produces an animation showing the transition from the original focus to the new focus node.

18. A user interface system comprising:
a plurality of nodes organized into a graph of information wherein at least one node is a source node having focus, and one or more nodes forming a sub-hierarchy of the source node and represented in a view in relation to the source node by inclusion, and where one or more nodes connecting to the focus are represented in relation to the focus in a manner adjacent to the focus,
a means for rendering nodes that operates according to a set of parameters that define the representation and position of nodes in the view, such that the nodes connected to the focus are represented by a visual cue in a view in an adjacent relation to the focus and according to the parameters, and where the one or more nodes forming a sub-hierarchy of the source node is represented by a visual cue in a view in relation to the source node by inclusion according to the parameters, and
wherein a user may select a node in the view to designate the selected node as the new focus node.

19. The user interface of claim 18, wherein the means for rendering nodes also defines the representation of links that connect one node to another node, and where one of the parameters in the set defining the representation and position of nodes in the view, relates to the angular range and effects the positions of individual branches, links and positions of relational nodes.

20. The user interface of claim 18, wherein the means for rendering nodes also defines the representation of links that connect one node to another node, and where one of the parameters in the set defining the representation and position of nodes in the view, relates to the angular center and effects the positions of individual branches, links and positions of relational nodes.

21. The user interface of claim 18, wherein the means for rendering nodes is capable of producing a visual cue to the user to indicate that a node in the view is connected to other nodes that are not displayed in the view.

22. The user interface of claim 18, wherein the means for rendering nodes is capable of producing a scaled representation of adjacent nodes in the system whereby according to a context-to-focus parameter, the scale adjustment of adjacent nodes in relation to the scale of the focus node is produced.

23. The user interface of claim 18, wherein the means for rendering nodes is capable of producing a fractal or radial relational view.

24. The user interface of claim 18, wherein the radial view produces nodes arranged in concentric circles.

25. The user interface of claim 18, wherein the means for rendering nodes is capable of producing a view selected from the group consisting of hierarchical, relational and mixed.

26. The user interface of claim 18, wherein a mixed view is selected and the means for rendering nodes produces nodes that appear to float above other nodes.

27. The user interface of claim 18, wherein the means for rendering nodes produces a representation of nodes according to a minimum node size.

28. The user interface of claim 18, wherein the means for rendering nodes in the view with a node to indicate that the node contains sub-hierarchy that is completely hidden.

29. The user interface of claim 18, wherein the means for rendering nodes in the view produces a representation of nodes using visual cues to facilitate user navigation in the system.

30. The user interface of claim 18, wherein the user adjustment of one or more parameters results in the display of few or many nodes to simplify exploration or facilitate an individual's understanding of the entire hierarchy of information, respectively.

31. The user interface of claim 18 wherein the graph of information relates to a member of the set consisting of query result set from database engine, query result set from internet search engine and file store.

32. The user interface of claim 18, wherein a parameter in the set used to render the representation of nodes in the view is selected from the group consisting of relational angular range, relational angular center, adjacency border ratio, context-to-focus ratio, maximum relational path length, relational layout, link-to-node ratio, view mode, multiple instance hiding flag, and maximum arrowhead path distance.

* * * * *